United States Patent [19]
Dauerer et al.

[11] Patent Number: 5,960,114
[45] Date of Patent: Sep. 28, 1999

[54] PROCESS FOR IDENTIFYING AND CAPTURING TEXT

[75] Inventors: Norman J. Dauerer; Donato O. Forlenza, both of Hopewell Junction; Edward E. Kelley, Wappingers Falls; Franco Motika, Hopewell Junction, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/739,136

[22] Filed: Oct. 28, 1996

[51] Int. Cl.$^6$ ...................................................... G06K 9/72
[52] U.S. Cl. ......................... 382/229; 382/231; 382/290; 707/513; 707/516; 707/524; 707/530
[58] Field of Search .................................... 382/229, 231, 382/290, 310, 311; 395/600; 364/419.17, 192; 707/500, 513, 516, 524, 530, 531, 539

[56] References Cited

U.S. PATENT DOCUMENTS

| | | | |
|---|---|---|---|
| 5,096,423 | 3/1992 | Goldwasser | 434/118 |
| 5,151,975 | 9/1992 | Shiraki et al. | 395/153 |
| 5,530,794 | 6/1996 | Luebbert | 395/148 |
| 5,544,048 | 8/1996 | Dugan et al. | 364/419.17 |

*Primary Examiner*—Leo H. Boudreau
*Assistant Examiner*—Kanji Patel
*Attorney, Agent, or Firm*—DeLio & Peterson LLC; Peter W. Peterson; Aziz M. Ahsan

[57] ABSTRACT

A process for identifying and capturing text comprising the steps of identifying delimiters in the text, selecting delimiters from the identified delimiters to be delimiters to the left and right of the selected text, indicating only one character of the text between the left and right delimiters, and automatically blocking and capturing the text having the indicated character. In an alternate embodiment, the process comprises the steps of identifying delimiters in the text that are to the left and to the right of a cursor and identifying the position of the delimiters relative to the cursor, specifying at least one particular delimiter position relative to the cursor, indicating only one character of the text between the cursor and the specified delimiter position, and automatically blocking and capturing the text having the indicated character.

18 Claims, 6 Drawing Sheets

PROCESS FOR IDENTIFYING AND CAPTURING TEXT

BACKGROUND OF THE INVENTION

1. Field of the Invention

The present invention relates generally to a process for identifying and capturing selected text comprising characters, character strings and groups of character strings.

2. Problem to be Solved

Word processing operating systems typically provide various functions for manipulating text in a document. For example, there are functions that enable the user to "cut", "copy", and "paste" blocks of text. Specifically, the "copy" function involves copying a portion of a character string to another location. A typical example of the "copy" function is to copy a portion of a path and append it to an existing command string to establish a new directory path. The "cut" and "paste" functions allow the user to extract an entire or portion of a character string and move or "paste" it to another location in the document. Such "cut", "copy" and "paste" functions significantly reduce the time in creating documents and also reduces the probability of error creation.

"Text blocking" is another text manipulation function. This function is typically utilized to implement the "cut", "copy" and "paste" functions discussed above. When implementing the "text blocking" function, the user marks a block of text or characters in order to perform a specific action on such text or characters. The action can be any one of the text manipulation functions discussed above, or other text manipulation functions that are standard in most word processing software systems.

The user typically implements the text manipulation functions discussed above with either a keyboard or a mouse. Both devices provide a manner in which the user may "point" to text or characters on a display screen. Typically, as the user moves the mouse, the pointer on the display screen moves in the same direction as movement as the mouse. A typical mouse contains at least one button that enables the user to invoke certain functions. For example, "clicking" and "holding" the mouse button (or the corresponding keys on a keyboard) allows the user to "block" a desired portion of text.

To implement the text manipulation functions discussed above, a typical process for identifying and capturing the text is implemented and comprises the following steps: (a) displaying the source of text, (b) pointing to the first character of the desired substring, (c) "clicking and holding" the button on the keyboard or mouse in order to "block" the selected text, (d) dragging or extending the "blocked" area to the last character, and (e) copying or moving the blocked area to a desired location, e.g. another location in the document, another document, etc. Step (e) could also comprise deleting the captured text.

The typical blocking process, as shown by steps (a)–(e) above, involves unnecessary steps. Furthermore, it is difficult to pinpoint the first and last character of the desired character substring within a block of text. The accuracy and time consumption in pin-pointing the first and last characters typically depends on the type of pointing device (mouse, keyboard, etc.) as well as the sensitivity of such devices. Additionally, the working environment also affects the accuracy and time consumption in pin-pointing characters.

It is therefore an object of the present invention to provide a new and improved process for identifying and capturing text.

It is another object of the present invention to provide a new and improved process for identifying and capturing text that is more efficient than conventional text identification and capturing processes.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for identifying and capturing text comprising the steps of:

a) identifying delimiters in the text;
b) selecting delimiters from the delimiters identified in step (a) to be delimiters to the left and right of the selected text;
c) indicating only one character of the selected text; and
d) automatically blocking and capturing the selected text.

In another aspect, the present invention is directed to a process for identifying and capturing text comprising the steps of:

a) identifying delimiters in the text;
b) specifying at least one delimiter relative to the cursor;
c) indicating only one character of the text between the cursor and the delimiter specified in step (b); and
d) automatically blocking and capturing the text having the character indicated in step (c).

In a related aspect, the present invention is directed to a process for identifying and capturing at least one character string or at least one group of character strings, comprising the steps of:

a) identifying at least one character string or at least one group of character strings and identifying variations of the identified character strings and groups of character strings;
b) selecting a character string or a group of character strings from the character strings or group character strings identified in step (a);
c) indicating only one character of the selected character string or group of character strings within the text; and
d) automatically blocking and capturing the entire selected character string or group of character strings having the character indicated in step (c).

BRIEF DESCRIPTION OF THE DRAWINGS

The features of the invention are believed to be novel and the elements characteristic of the invention are set forth with particularity in the appended claims. The invention itself, both as to organization and process of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–5B of the drawings in which like numerals refer to like features of the invention. The figures are for illustration purposes only and are not drawn to scale.

Figure 1:
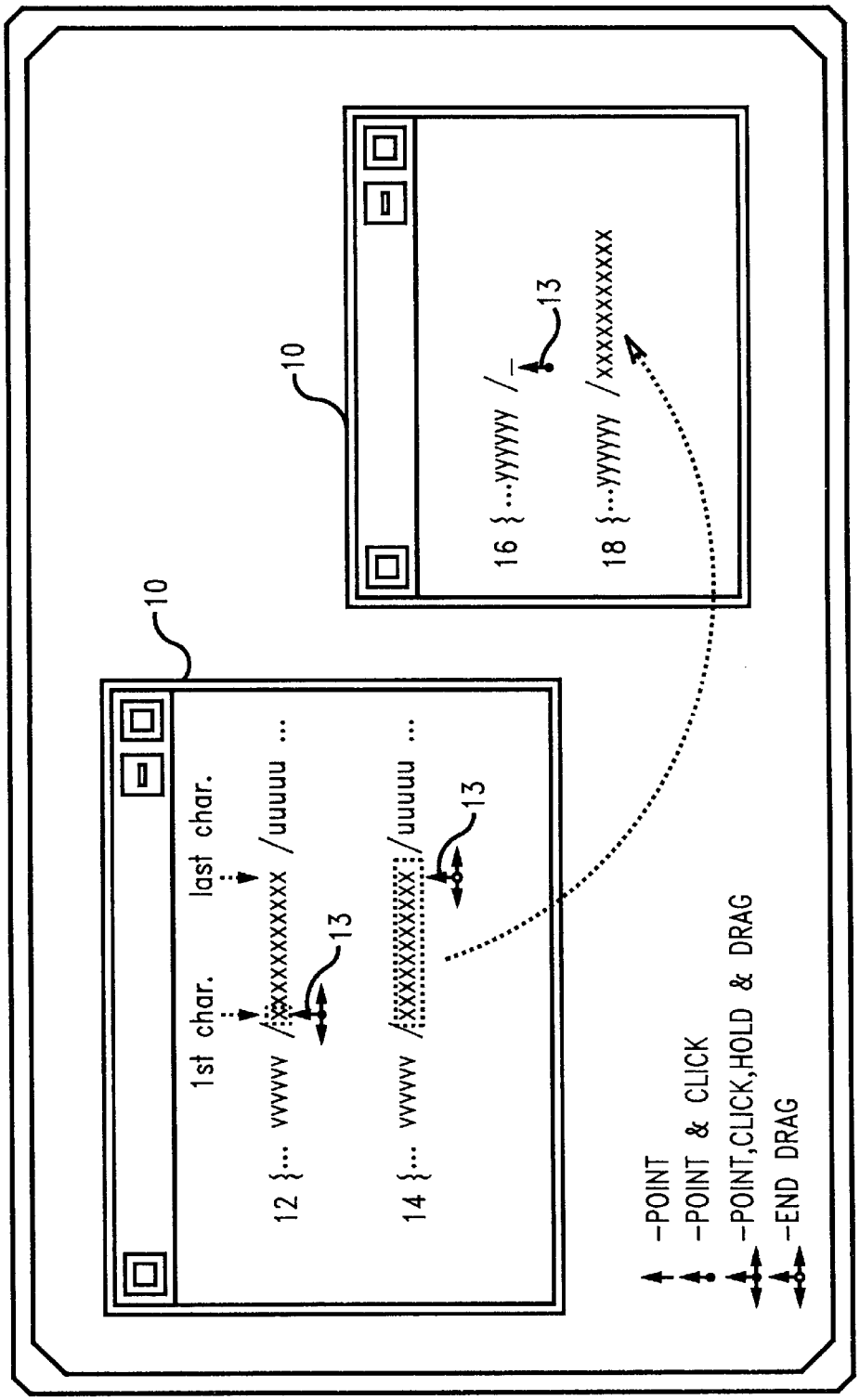
FIG. 1 is a diagram that generally illustrates conventional identification and capturing processes.
Figure 2:
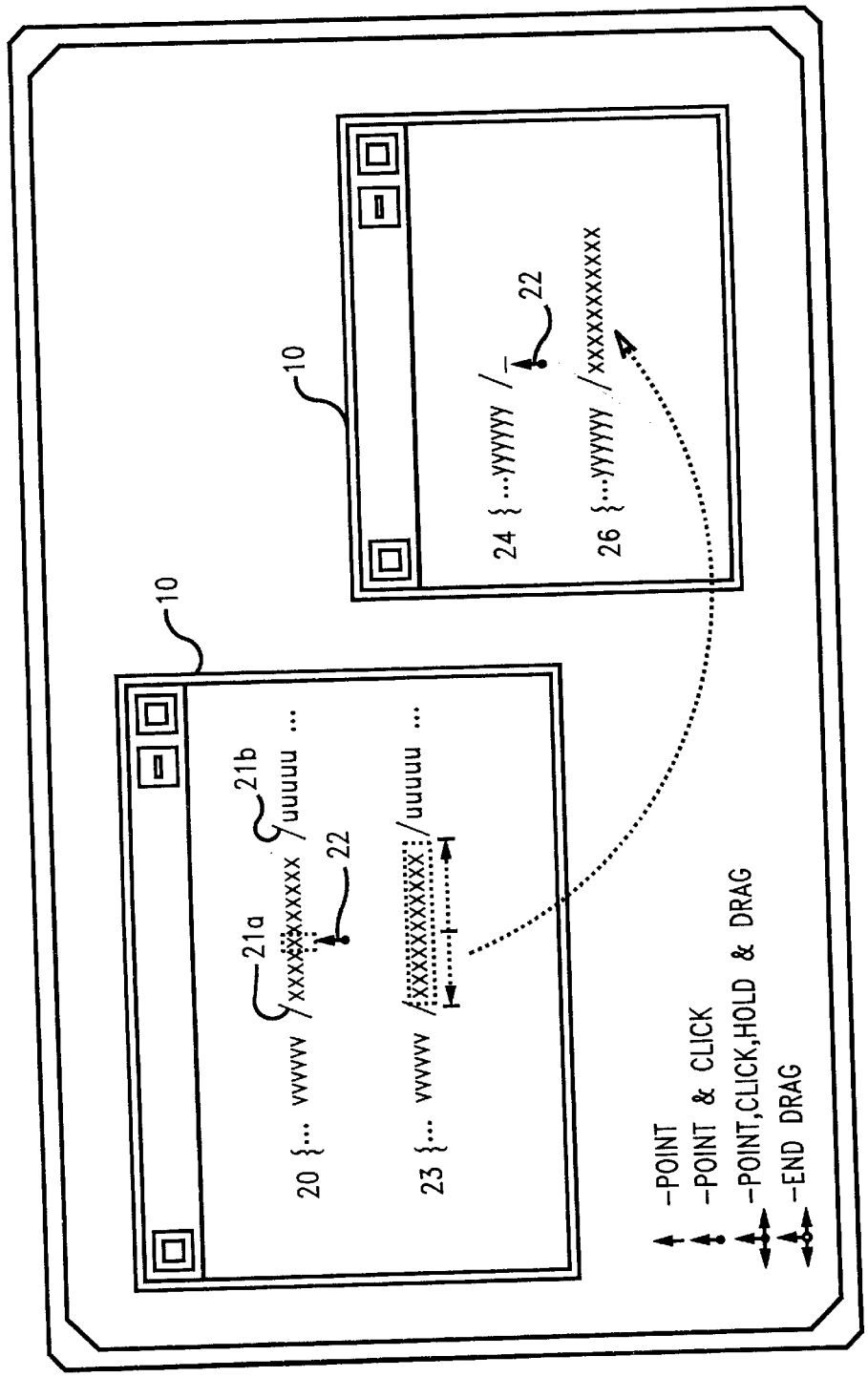
FIG. 2 is a diagram illustrating a text identification and capturing process of the present invention.

FIG. 1 illustrates conventional text blocking and copying functions as described by steps (a)–(e) described above. Screen 10 displays lines of text indicated by numerals 12, 14, 16 and 18. The user points the pointing device, e.g. a mouse, to the first "X" character in text line 12 such that cursor 13 is aligned with the desired character. The user then "clicks and holds" the pointing device to "block" all of the selected "X" characters as shown in text line 14. This is known as dragging or extending the "blocked" area to the last character. The desired location to where the blocked text is to be moved is text line 16 and is indicated by cursor 13. The selected "blocked" text is added to the text line 16 to form text line 18.

The process of the present invention simplifies text identification and capture by pre-defining commonly used delimiters and then pointing and clicking, with a pointing device, anywhere on the desired character string. The process of the present invention then automatically extends the selected text to the next, closest left and right delimiting characters until one of the predefined delimiters is encountered. Thus, the process of the present invention replaces steps (b)–(d) discussed above with a single, course "point and click" operation.

The process of the present invention utilizes a predefined logic set to enable the user to make selections from a "pop-up" window. The predefined logic itself may also be selected from the window. The predetermined logic may be configured to capture a phrase that includes a mixture of common delimiters such as ",", ".", "/", "\", and "blank". Additionally, the predetermined logic can also be used to define paragraphs. For example, a paragraph can be grabbed in its entirety by simply pointing, with the pointing device, to the paragraph.

Although the specific implementation of the predefined logic functions may vary between different applications and operating systems, the process of the present invention may be applied to a broad range of system configurations.

Figure 5A:
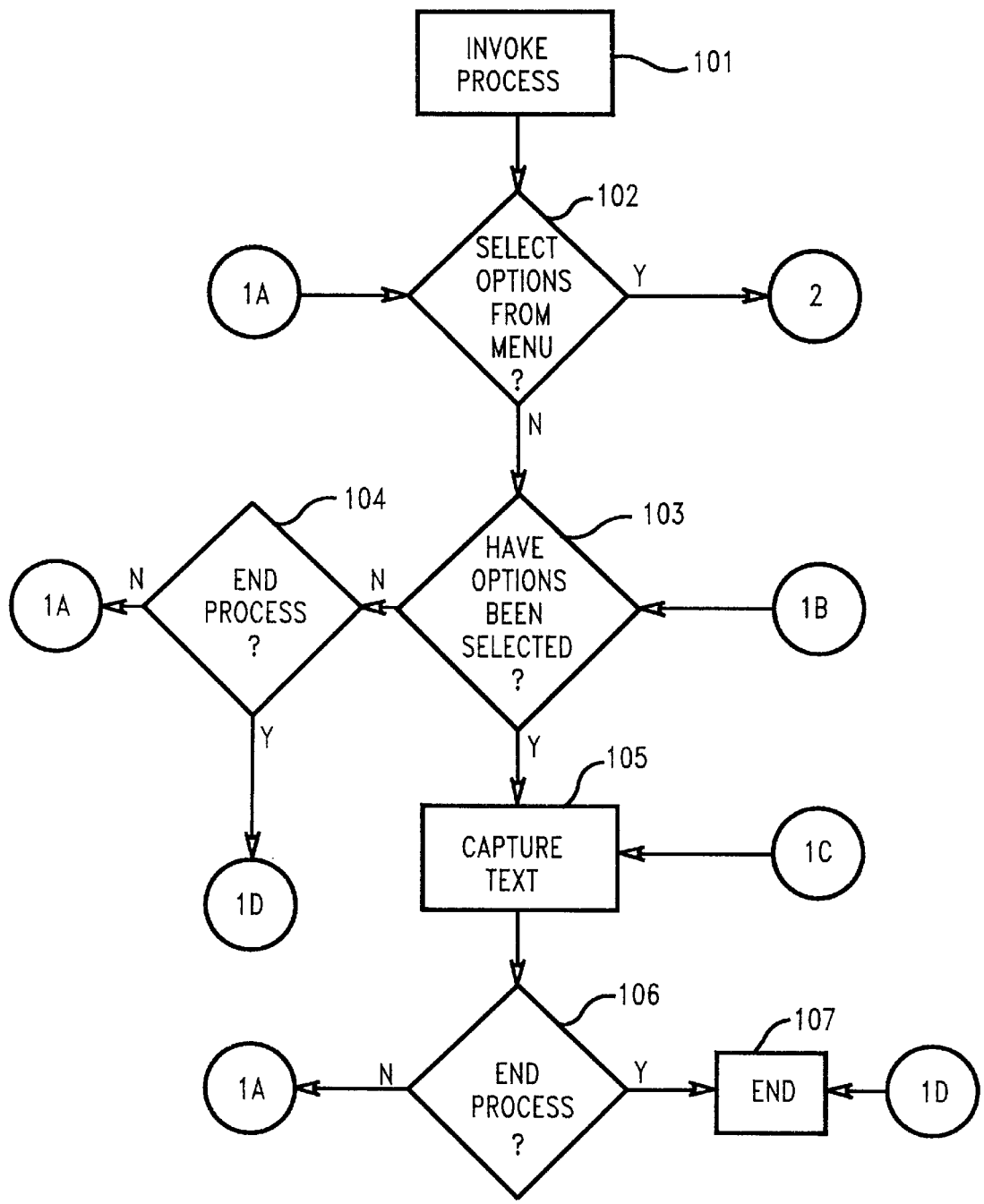
FIGS. 5A and 5B are flow diagrams of the process of the present invention.
Figure 5B:
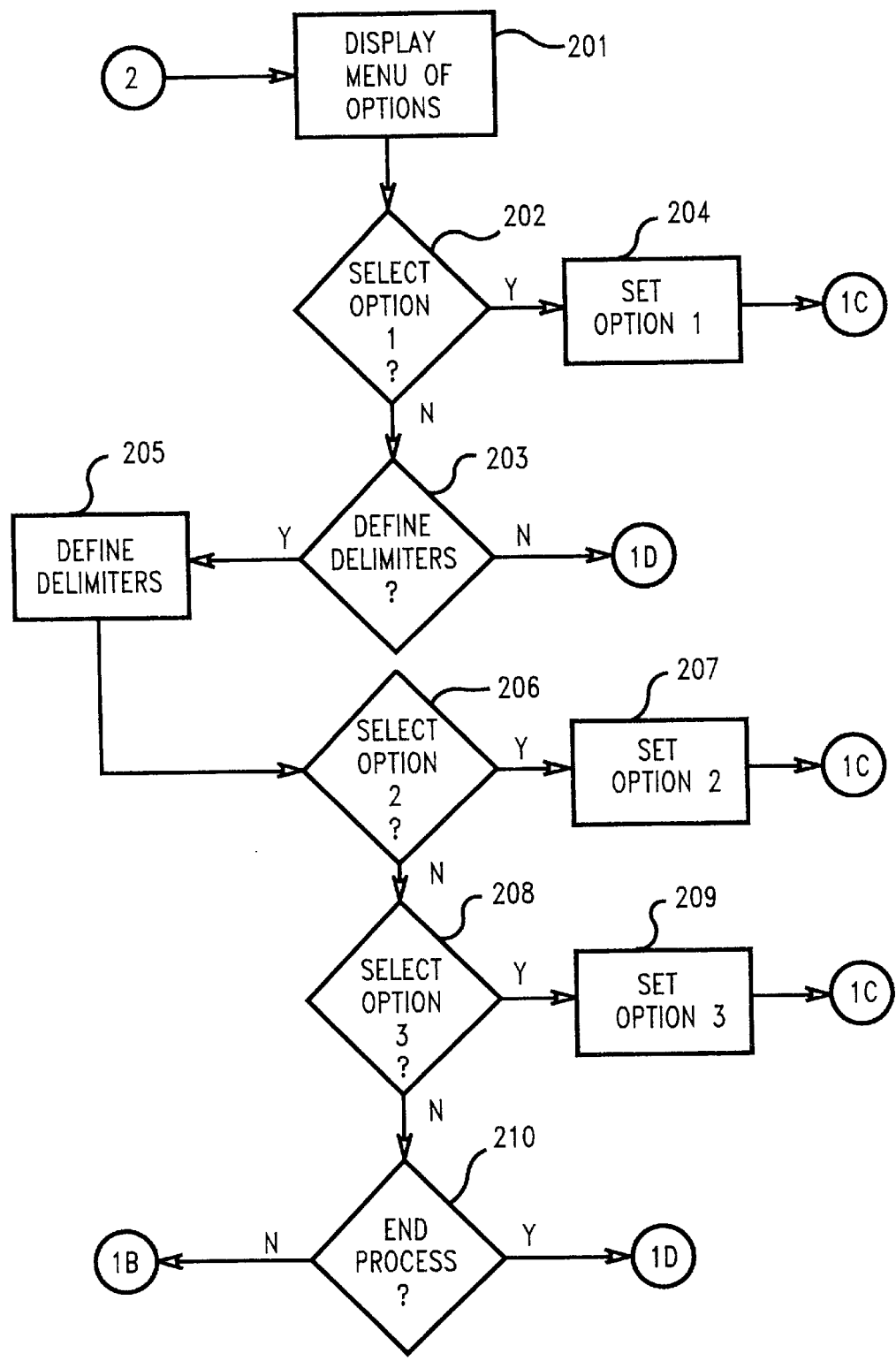

Referring to FIG. 5A, the process of the present starts at step 101 which effects invocation of the process of the present invention.

In step 102, it is determined if the user desires to select identification and capture options from a menu. If the user desires to select such an option, the process shifts to step 201. Step 201 and the steps subsequent thereto will be discussed below in detail.

Step 103 determines if a text identification and capture option has been selected from the menu presented in step 201. If such an option has been selected, the process continues to step 105. If an option has not been selected, the process shifts to step 104.

Step 104 determines whether the process of the present invention is to be terminated. If the user desires to end the process, the process shifts to step 107 where the process is ended. If it is determined that the process is not to end, but rather continue with another iteration, the process shifts back to step 102.

Step 105 effects capturing the "blocked" text (also referred to as the "source") as a result of implementation of any of the text identification and capture options. These options are discussed in detail in the description of steps 201–209. As used herein, the term "capture" includes the "cut" and "copy" functions defined above.

After the "blocked" text is captured in step 105, the process shifts to step 106. Step 106 determines if the user desires to end the process of the present invention. If the user desires to end the process, the process shifts to step 107 wherein the process is terminated. If the user desires to continue the process of the present invention, the process shifts back to step 102 to determine if a selection is to be made from the menu containing the text identification and capture options.

Step 201 effects display of a menu of text identification and capture options, e.g. Options 1–3. This selection menu lists the text identification and capture options available to the user. Each option corresponds to a specific text identification and capture process of the present invention. The menu is displayed via a display device.

In step 202, it is determined if the user desires to select Option 1. If the user does not want to select Option 1, the process continues to step 203. If the user desires Option 1, the process shifts to step 204 which effects setting Option 1. Step 204 effects display of a "pop-up" menu that enables the user to select various types of logic used in the selection process. The selected logic depends upon the task the user is trying to accomplish. The user may also specify what logic is to be included in the "pop-up" menu. For instance, the logic may define a search routine for a document having a name that consists of certain characters or symbols. For example, if a document name has a prefix of "MPS" followed by two (2) digits, and then four (4) additional digits, the selected logic would enable the user to search the document for all the possible variations of the aforementioned document name. For example, the document name could be represented as "MPS23-1234", "MPS 23-1234", "MPS 23 1234", or "MPS23 1234". The logic may also be configured to provide multiple suffixes, e.g. "DSP" or "QA". The selected logic effects the capture of any document that follows a predetermined set of conditions by merely pointing to any part of the document. Thus, the logic can enable the user to capture any character string having the characters "MPS", or a specific character string having "MPS" followed by a specific number, or every character string having "MPS" followed by the specific number.

The process invoked by step 204 effects identifying and capturing at least one character string or at least one group of character strings. The first step in the process invoked by Option 1 is identifying at least one character string or at least one group of character strings and identifying variations of the identified character strings or groups of character strings. The next step entails selecting a character string or a group of character strings from the identified character strings or identified group of character strings. The next step is indicating only one character of the selected character string or group of character strings within the text. The user then activates the pointing device to automatically block and capture the entire selected character string or group of character strings having the indicated character. For this option, as well as the options discussed below, characters may be alpha-numeric characters or symbols such as "#", "*", "+", "–", etc.

In step 202, if it is determined that Option 1 has not been selected, the process shifts to step 203. Step 203 determines if delimiters are to be selected. If no delimiters are to be selected, the process shifts to step 107 where the process is terminated. If delimiters are to be selected, the process shifts to step 205 which effects defining delimiters that are to be used in identifying and capturing selected text. The user can dynamically define a set of delimiting characters to be used in identifying and capturing text. Some of the possible delimiting characters may include ",", ".", "/", "\", and "blank". The delimiters can also be any valid ASCII character or hexadecimal code.

Figure 3:
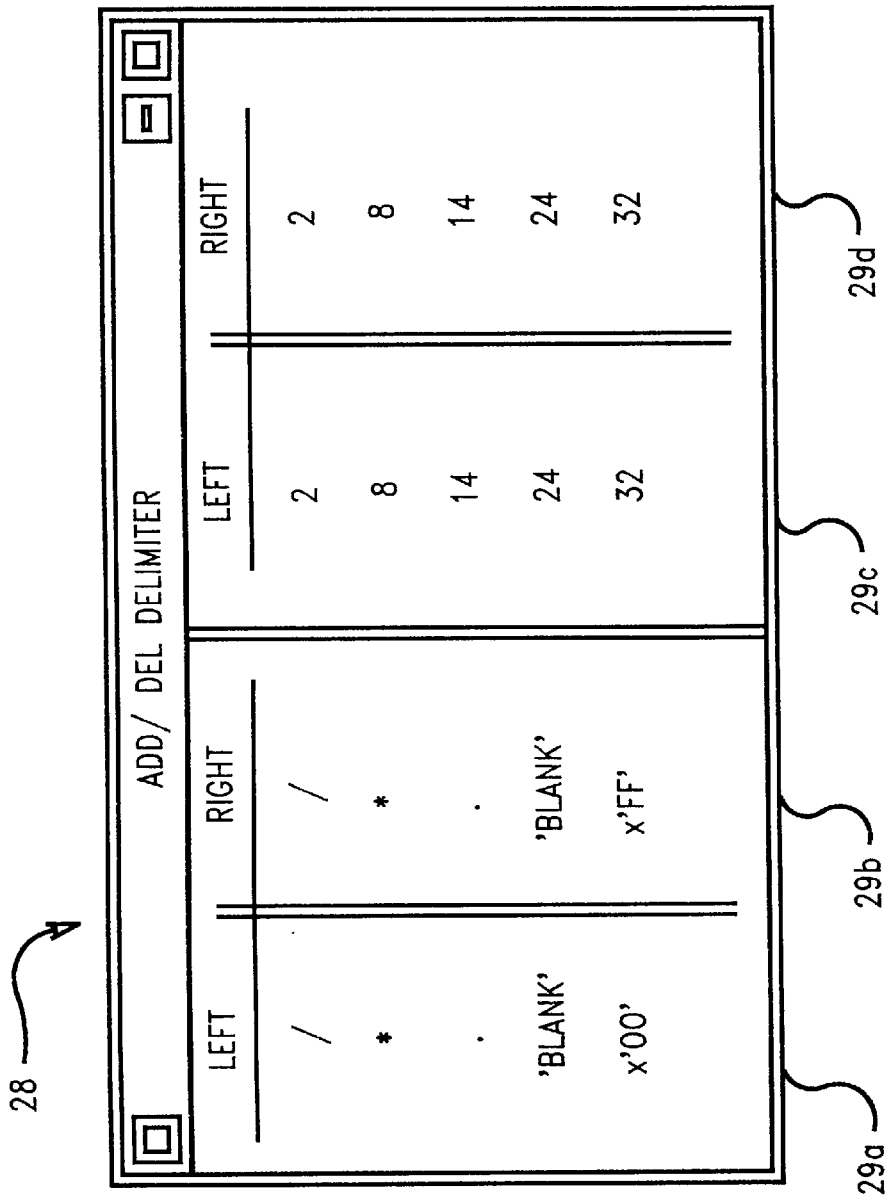
FIG. 3 is a diagram illustrating a delimiter selection function of the text identification and capturing process of the present invention.
Figure 4:
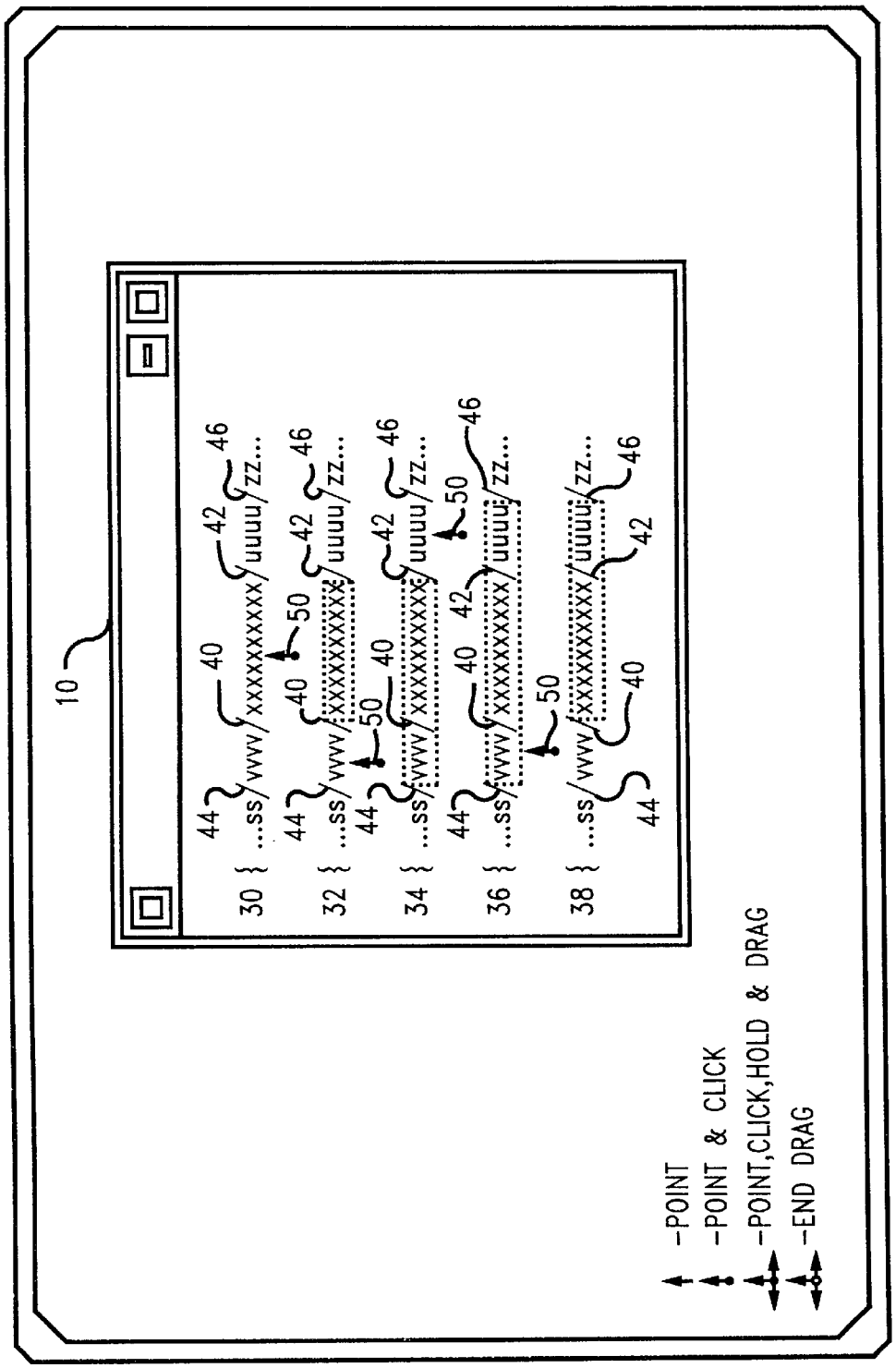
FIG. 4 is a diagram illustrating blocking extension and contraction features of the text identification and capturing process of the present invention.

Referring to FIG. 3, the user begins the process of defining the delimiters by depressing an alternate button on the pointing device to display a relatively, small-sized window 28. Window 28 comprises of two (2) sets of columns. The first set of columns contains columns 29a and 29b. Column 29a comprises a list of the left delimiters and column 29b comprises a list of the right delimiters. Thus, the user can point to a left delimiter and a right delimiter to define selected text that is to be subsequently identified, blocked and captured. For example, the user can point to the left delimiter "/" and the right delimiter "/" to define all the text between these delimiters as the text to be subsequently blocked captured. New delimiting characters may be added to the window. Furthermore, characters formed by delimiting existing delimiting characters may also be added to the window. The defined delimiters may be used in the any of the options described below.

Referring again to FIG. 3, the second set of columns contains columns 29c and 29d. Column 29c comprises a list of the positions of the left delimiters relative to the cursor and/or other left delimiters. Similarly, column 29d comprises a list of the positions of the right delimiters relative to the cursor and/or other right delimiters. The user may define selected text to be subsequently blocked and captured by pointing to delimiter positions in columns 29c. For example, the user may point to the number "2" in the left and right columns 29c and 29d, respectively, to indicate that the selected text is between the second delimiter to the left of the cursor and the second delimiter to the right of the cursor. If the user points to the number "8" in columns 29c and 29d, then the selected delimiters are the eighth delimiter to the left of the cursor and the eighth delimiter to the right of the cursor. The user may also delete the delimiter positions currently shown in columns 29c and 29d and enter different delimiter positions. If a current delimiter position is deleted but no new number is entered, the delimiter position defaults to "1", i.e. the first delimiter from the cursor. Once the delimiters are defined, the process shifts to step 206.

Step 206 determines if Option 2 has been selected. If Option 2 has been selected, the process shifts to step 207. Step 207 stores the delimiters defined in step 205. Specifically, the process of Option 2 allows the user to select text that is located between the delimiters to the left and right of the selected text. For example, a left delimiter may be a "/" and a right delimiter may also be a "/". The delimiters need not be the same. For example, the left delimiter may be a "&", and the right delimiter may be a "/". For example, in FIG. 2, text line 20 shows specified left and right delimiters 21a and 21b as being "/". Referring to text line 23, the user then points, with the cursor, to only one character of the text between the delimiters to automatically block all the text between the delimiters. The user then activates the pointing device or keyboard to automatically capture the "blocked" text. The desired location of the captured text is indicated by cursor 22 in text line 24. The captured text is moved or copied to the desired location as shown in text line 26. The process of the present invention interacts with the appropriate hardware to distinguish between left and right delimiting characters.

If in step 206, it is determined that Option 2 has not been selected, the process shifts to step 208. Step 208 determines if Option 3 has been selected. If Option 3 has not been selected, the process shifts to step 210. If Option 3 has been selected, the process shifts to step 209. Step 209 stores the delimiters defined in step 205 and invokes another process for identifying and capturing text. The process invoked by step 209 allows the user to expand and contract "captured" text when the "capture" function is a "copy" function. For example, in the line of text indicated by numeral 30 in FIG. 4, delimiters 40, 42, 44 and 46 are identified in the text of interest. Cursor 50 is then positioned at a desired position. The user then refers to window 28 to specify left and right delimiters. This can be accomplished through columns 29a, 29b or columns 29c, 29d. As shown by text line 32, the user has selected the first delimiters to the left and right of cursor 50, i.e. delimiters are 40 and 42. Since the cursor is already pointing to one character, the user need only activate the pointing device to automatically block and capture all the text between delimiters 40 and 42.

If the user desires to expand the blocked text, then the user specifies another delimiter from window 28 shown in FIG. 3. The user can specify another delimiter either through columns 29a, 29b or through columns 29c, 29d. For example and as shown in text line 32, if the user desires to expand the blocked text to include all the "V" characters, the user "points and clicks" on the number "2" in the left column 29c to indicate the second delimiter to the left of the cursor. The second delimiter to the left of the cursor is delimiter 44. The user then points to one character between the previously selected delimiter 40 and delimiter 44. The user then activates the pointing device to automatically block and capture all the text between delimiters 40 and 44 as shown by text line 34.

If the user desires to expand the blocked text in the opposite direction, the user specifies another delimiter from window 28 shown in FIG. 3. As described above, the user can specify another delimiter either through columns 29a, 29b or through columns 29c, 29d. For example and as shown by text line 34, if the user desires to expand the blocked text to include all the "u" characters to the right of the cursor, the user "points and clicks' on the "2" in right column 29d to indicate the second delimiter to the right of the cursor. The second delimiter to the right of the cursor is delimiter 46. The user then points to one character between the previously selected delimiter 42 and delimiter 46. The user then activates the pointing device to automatically block and capture all the text between delimiters 42 and 46 as shown by text line 36.

To contract or reduce the blocked text shown in the line of text indicated by line 36, the user specifies a delimiter through window 28 to which the blocked text is to be contracted or reduced. For example, if the user desires to reduce the blocked text so as to eliminate the "v" characters, the user must "point and click" on the number "1" in column 29c to indicate the first delimiter to the left of the cursor. If the number "1" does not exist in column 29c, the user may delete a number from this column and either type in the number "1", or type nothing so as to invoke the default value of "1". As shown in text line 36 in FIG. 4, the first delimiter to the left of the cursor is delimiter 40. The user then points to only one character of text between delimiters 40 and 44 and activates the pointing device to automatically contract or reduce the blocked text to delimiter 40. This is illustrated by text line 38.

After step 208, the process shifts to step 210. Step 210 determines if the user desires to end the process. If the user desires to end the process, step 107 ends the process. If the user desires to continue the process of the present invention, the process shifts back to step 102.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for identifying and capturing text comprising the steps of:
    a) identifying delimiters in the text;
    b) defining and selecting at least two unmatched delimiters different from the delimiters identified in step (a) to be delimiters to the left and right of a cursor, wherein the plurality of delimiters between the cursor and the selected delimiter to the left of the cursor may not equal the plurality of delimiters between the cursor and the selected delimiter to the right of the cursor;
    c) indicating only one character of selected text between the selected delimiters; and
    d) automatically blocking and capturing the selected text between the selected delimiters.

2. The process according to claim 1 wherein identifying step (a) includes displaying the delimiters to the left and right of the selected text.

3. The process according to claim 1 wherein indicating step (c) comprises pointing to the character with a pointing device.

4. A process for identifying and capturing text comprising the steps of:
    a) identifying delimiters in the text;
    b) specifying at least one delimiter different from the delimiters identified in step (a) relative to the cursor;
    c) indicating only one character of the text between the cursor and the delimiter specified in step (b); and
    d) automatically blocking and capturing the text having the character indicated in step (c).

5. The process according to claim 4 wherein specifying step (b) comprises specifying the at least one delimiter relative to the cursor.

6. The process according to claim 4 further comprising the following steps:
    e) indicating only one character of the text between the delimiters specified in step (b); and
    f) automatically blocking the text to include only the text between the cursor and the delimiters specified in step (b) and automatically capturing the blocked text.

7. The process according to claim 4 further comprising the steps of:
    e) specifying an additional delimiter relative to the cursor such that the additional delimiter is between the cursor and the delimiter specified in step (b);
    f) indicating only one character of the text between the additional delimiter and the cursor; and
    g) automatically contracting the blocked text to include only the text between the cursor and the additional delimiter and automatically capturing the blocked text.

8. The process according to claim 4 wherein expanding step (f) comprises activating a pointing device to automatically expand and capture the blocked text to include the text up to the additional delimiter.

9. A process for identifying and capturing at least one character string or at least one group of character strings, comprising the steps of:
    a) selecting various types of logic for identifying a predetermined set of conditions of the identified character strings and groups of character strings, wherein said logic identifies at least one character string or at least one group of character strings;
    b) selecting a character string or a group of character strings from the character strings or group character strings identified in step (a), wherein the character string selected is a variation of the character string identified;
    c) indicating only one character of the selected character string or group of character strings within the text; and
    d) automatically blocking and capturing the entire selected character string or group of character strings having any one of the predetermined set of conditions.

10. The process according to claim 9 wherein indicating step (c) comprises pointing to the character with a pointing device.

11. The process according to claim 10 wherein the pointing step comprises positioning a cursor on the character.

12. The process according to claim 9 wherein step (d) comprises automatically blocking and capturing only the character string or group of character strings having the character indicated in step (c).

13. The process according to claim 9 wherein step (d) comprises automatically blocking and capturing all character strings or groups of character strings identified in step (a).

14. The process according to claim 9 wherein identifying step (a) includes displaying the character string or group of character strings.

15. The process according to claim 9 further including the step of deleting the character string or group of character strings automatically blocked and captured in step (d).

16. The process according to claim 9 further including the step of moving the character string or group of character strings automatically blocked and captured in step (d).

17. The process according to claim 9 further including the step of copying the character string or group of character strings automatically blocked and captured in step (d).

18. A process for identifying and capturing text comprising the steps of:
    a) determining if delimiters are to be identified in the text;
    b) implementing a first sub-process if in step (a), it is determined that delimiters are not to be identified, the first sub-process comprising the steps of:
        identifying at least one character string or at least one group of character strings and selecting various types of logic for identifying a predetermined set of conditions of the identified character strings and groups of character strings,
        selecting a character string or a group of character strings from the identified character strings or identified group of character strings,
        indicating only one character of the selected character string or group of character strings within the text, and
        automatically blocking and capturing the entire selected character string or group of character strings having any one of the predetermined set of conditions;
    c) determining if delimiters are to define the selected text to be identified and captured;
    d) implementing a second sub-process if it is determined in step (c) that delimiters are to define the selected text, the second sub-process comprising the steps of:

identifying delimiters in the text, defining and selecting at least two unmatched delimiters different from the delimiters identified in step (a) to be delimiters to the left and right of a cursor, wherein the plurality of delimiters between the cursor and the selected delimiter to the left of the cursor may not equal the plurality of delimiters between the cursor and the selected delimiter to the right of the cursor, indicating only one character of selected text between the selected delimiters, and automatically blocking and capturing the selected text between the selected delimiters; and e) implementing a third sub-process if it is determined in step (d) delimiters are not to define the selected text, the third sub-process comprising the steps of:

identifying delimiters in the text;

specifying at least one delimiter relative to the cursor;

indicating only one character of the text between the cursor and the delimiter specified in step (b), and automatically blocking and capturing the text having the character indicated in step (c).

* * * * *

UNITED STATES PATENT AND TRADEMARK OFFICE
CERTIFICATE OF CORRECTION

PATENT NO. : 5,960,114
DATED : September 28, 1999
INVENTOR(S) : Dauerer et al.

It is certified that error appears in the above-identified patent and that said Letters Patent is hereby corrected as shown below:

Col. 3, Line 48, delete "of the present"

Col. 5, Line 13, delete "comprises" and substitute therefor

--is comprised--

Signed and Sealed this

Fourteenth Day of March, 2000

Attest:

Q. TODD DICKINSON

*Attesting Officer*  *Commissioner of Patents and Trademarks*